United States Patent [19]

Sheng et al.

[11] Patent Number: 4,477,908
[45] Date of Patent: Oct. 16, 1984

[54] COLD CATHODE CONSTRUCTION

[75] Inventors: Shinan-Chur Sheng; Joseph B. Lastovka, both of Sunnyvale, Calif.

[73] Assignee: Spectra-Physics, Inc., San Jose, Calif.

[21] Appl. No.: 357,501

[22] Filed: Mar. 12, 1982

[51] Int. Cl.³ ............................................. H01S 3/02
[52] U.S. Cl. ........................................ 372/88; 372/61
[58] Field of Search ............................. 372/87, 88, 61

[56] References Cited

U.S. PATENT DOCUMENTS 4,007,431  2/1977  Abbink et al. .................... 372/88
4,158,821  6/1979  Bresman .......................... 372/88

FOREIGN PATENT DOCUMENTS 0584661  5/1979  U.S.S.R. ........................... 372/87

Primary Examiner—James W. Davie
Attorney, Agent, or Firm—Donald C. Feix

[57] ABSTRACT

A cold cathode gas discharge apparatus, of the kind in which ionized species are driven against a cathode by an electrical field to eject electrons from the cathode and to produce a discharge within a gas discharge confinement tube, has a cathode constructed for balancing the trapping rate and releasing rate of gas particles in the cathode to maintain a substantially constant gas pressure during the operating life of the gas discharge apparatus. The cathode has an active surface which forms a substantially reentrant cavity about the end of the gas discharge confinement tube.

1 Claim, 7 Drawing Figures

GAS RELEASE MODE

COLD CATHODE CONSTRUCTION

BACKGROUND OF THE INVENTION

The present invention relates to a cathode for a cold cathode gas discharge device. The present invention has particular application to a cold cathode apparatus and methods for the construction and operation of gas lasers.

Cold cathode gas lasers utilize an electrical gas discharge in which ionized species are accelerated toward the cathode by an electrical field. When the ions strike the cathode, electrons are ejected from the cathode. This produces the electrical operation of the cathode/anode structure and the resulting light emitting gas discharge within a gas discharge confinement bore extending between the cathode and the anode.

There is a tendency for some of the ions which are accelerated toward the cathode to become buried in the cathode.

There is also a sputtering effect in which the impacting ions knock out some of the cathode material. This sputtered material diffuses until it contacts some surface of the laser. Gas can be trapped beneath the sputtered material when the sputtered material settles back onto a surface of the laser.

Gas lasers operate at low gas pressures, about a few torr. After some period of time of operation, the gas lost because of the ions buried in the cathode and entrapped by the sputtering action can cause a drop in the gas pressure of the laser and a drop in the power output of the laser.

The cathode constructions used with prior art lasers have presented problems in obtaining a predictable operating life for the laser. Some prior art gas lasers might operate satisfactorily for only about 5,000 hours while others would operate satisfactorily for 30,000 or more hours.

Since sputtering, and the resultant entrapment of gas in the gas laser, cannot be eliminated, the prior art apparatus and methods have attempted to solve the problem by trying to control the rate of sputtering. Various materials have been used for the cathode. Aluminum is commonly used because it is not too expensive, it is not too dirty, and it is easy to oxidize. Oxidized aluminum produces a surface layer which has a relatively low sputtering rate.

The loss of gas, and gas pressure, as described generally above, is referred to as "gas cleanup" in the gas laser art.

There is another effect which occurs during the operation of the gas laser and which results in the release of gas previously entrapped in the cathode. In this gas release mode the impacting ions are effective to release gas atoms or molecules that have been previously entrapped. The impacting ions do this by sputtering cathode material above or beside the entrapped gas atoms or molecules.

The conventional prior art thinking had been that it was necessary to have a relatively large surface area for the active surface of the cathode in order to minimize hot spots. That is, a large surface area had been considered to be useful and necessary in order to produce a low current density to minimize sputtering and gas clean-up. Prior art cold cathode structures often incorporated long cylindrical tubes with the end of the bore positioned within the interior of the cylindrical cathode tube.

It was discovered, in the present invention that, during operation of this prior art structure, some parts of the cathode operated at a higher current density than other parts of the cathode. The higher current density areas of this prior art cathode construction sputtered more material than the lower current density areas. Gas was trapped by the sputtered material over a broader area than the area of higher current density itself because the material sputtered from the higher current density area diffused into areas of lower current density. During continued operation of the laser less of the trapped gas in the lower current density area was subsequently released because the area was a lower current density area and therefore released less gas in the release mode. The result was permanent trapping of gas because of the non-uniform current density over the active surface of the prior art cathodes.

SUMMARY OF THE PRESENT INVENTION

It is a primary object of the present invention to overcome the problems presented by the cold cathode apparatus and methods of operation of prior art.

It is a specific object of the present invention to construct the active surface of the cathode in a cold cathode gas discharge device in a way to achieve a balance between the trapping rate and the releasing rate which enables a substantially constant gas pressure to be maintained in a gas laser during its operating life.

Another object of the present invention is to achieve this balance by producing a substantially uniform distribution of current density over the active surface of the cathode.

Further objects of the present invention are to increase the useful life of gas lasers and to reduce the physical size of the cathode as compared to the size of the cathodes in the prior art. A smaller cathode permits the overall size of the gas laser to be reduced while obtaining better performance. If the same overall package size for the laser is retained, a smaller cathode permits the bore to be lengthened, as compared to the prior art. A longer bore produces more power in gas lasers of the kind having coaxial tube construction.

The active surface of the cathode of the present invention forms a substantially reentrant cavity about the bore end. The shape of the active surface and the location of the bore end with respect to the active surface accommodate perturbations in the electric field (resulting from the necessity to provide one or more openings in the cathode) to maintain a substantially uniform distribution of current density on the active surface.

In a specific embodiment of the present invention the cathode cavity is constructed in two halves which mate together, and the inner surface of each mating half is formed as a substantially spherical surface.

In other applications, the active surface may be formed in the shape of a surface of revolution or a multifaceted flat faced cavity. The important feature is that the surface is a substantially reentrant cavity which distributes the various points on the surface with respect to the bore end so as to provide a substantially uniform distribution of current density over the active surface of the cathode for obtaining a balance between gas trapping and release.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 4 shows how the ionized atoms accelerated by the electric field impact the cathode to eject electrons. FIG. 4 also shows (a) how some of the ionized atoms become buried in the cathode so as to result in a loss of gas pressure (see the left hand side of FIG. 4) and (b) shows how some of the ionized atoms produce a sputtering action on the material of the cathode which can result in trapping of gas atoms to produce an effective loss of gas pressure (see the right hand side of FIG. 4).

FIG. 6 illustrates how the current distribution is non-uniform along the length of the conventional cathode. The dashed lines at the bottom of FIG. 6 show the location of the end of the bore within the cathode for the current distribution illustrated.

FIG. 7 illustrates how a non-uniform current distribution produces an imbalance between the gas clean-up and the gas release along the length of the conventional cathode.

DESCRIPTION OF THE PREFERRED EMBODIMENTS

Figure 1:
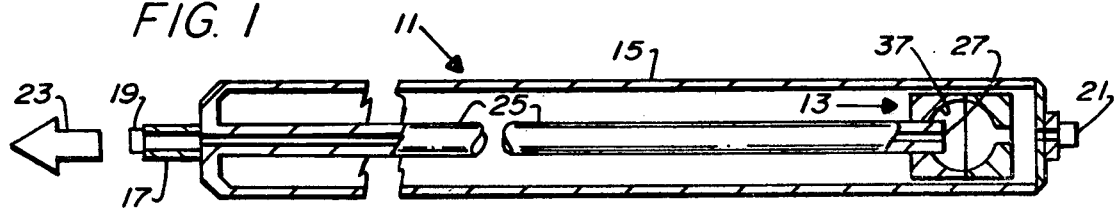
FIG. 1 is an elevation view, partly in cross section to show details of construction, of a coaxial laser tube incorporating a cathode constructed in accordance with one embodiment of the present invention.

FIG. 1 shows a coaxial laser tube incorporating a cold cathode constructed in accordance with one embodiment of the present invention. In FIG. 1 the laser tube is indicated generally by the reference numeral 11.

Figure 2:
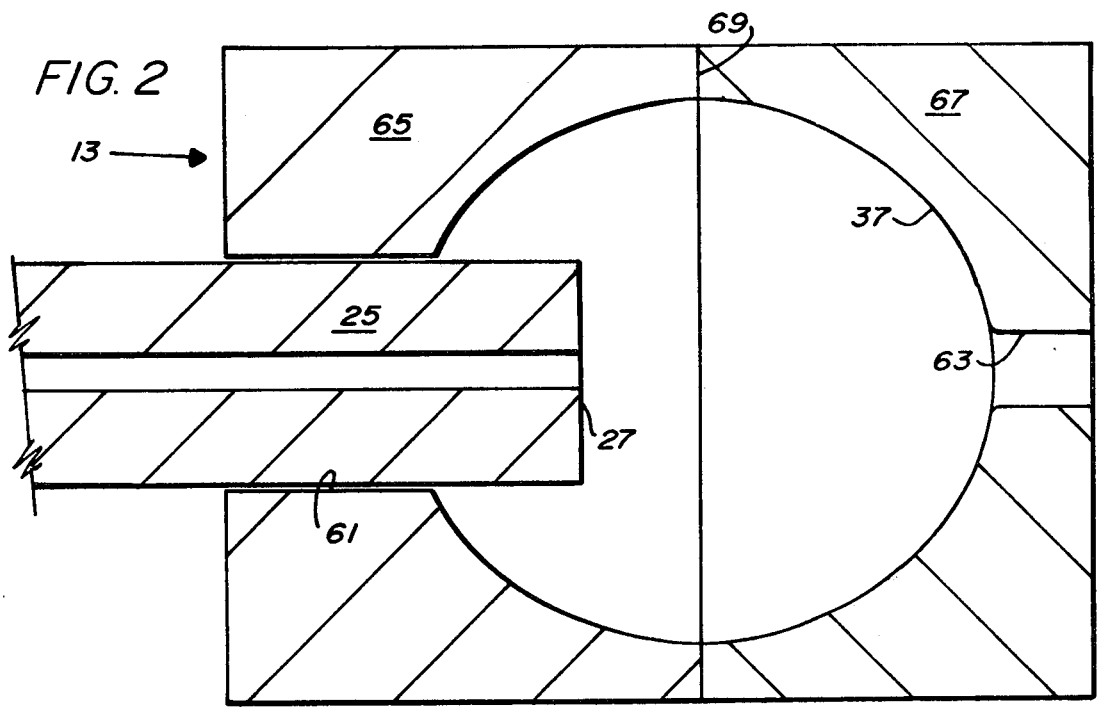
FIG. 2 is an enlarged view showing details of the cathode incorporated in the laser tube shown in FIG. 1.

The cathode constructed in accordance with the present invention is indicated generally by the reference numeral 13 in FIG. 1 and in FIG. 2.

The laser tube 11 comprises an outer tube 15 and an anode 17.

Mirrors 19 and 21 provide the resonant cavity for the laser beam; and, in accordance with usual practice, one of the mirrors is a partially transmitting mirror to permit the laser beam to project from the laser tube 11 in the direction indicated by the arrow 23.

The laser tube 11 comprises a bore 25 for confining the discharge. The bore 25 has an end 27 which projects into the interior of the cathode 13 of the present invention.

The construction and operation of the cathode 13 will be described in more detail below. At this point it may be noted, however, that the cathode 13 provides a substantially fully enclosed active cathode surface 37, and the surface 37 is configured to have a specific geometrical relationship with the end 27 of the bore.

Figure 3:
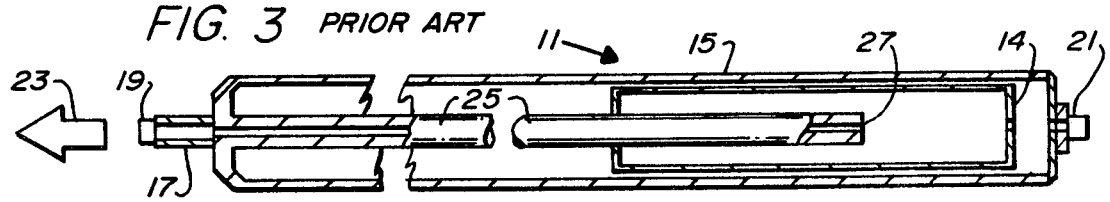
FIG. 3 is an elevation view like FIG. 1 but showing the laser tube incorporating a cathode as used in the prior art.

FIG. 3 shows a laser tube like the laser tube shown in FIG. 1 but having a cathode 14 constructed in accordance with conventional, prior art practices. The parts of FIG. 3 which correspond to the same parts in FIG. 1 have been indicated by the same reference numerals.

Aluminum is generally used as a cathode material because it is relatively inexpensive and easy to oxidize. Aluminum oxide is a very low sputtering material, and this is desirable in cold cathode operation.

By reducing sputtering it is possible, at least in theory, to reduce the entrapment of gas and resulting loss of pressure, as will be described in more detail below with reference to FIG. 4.

As illustrated in FIG. 3 the conventional, prior art cathodes 14 were relatively large structures. That is, it was thought that having a large surface area would help to produce a low current density, which, in turn, would help reduce the sputtering rate.

Figure 4:
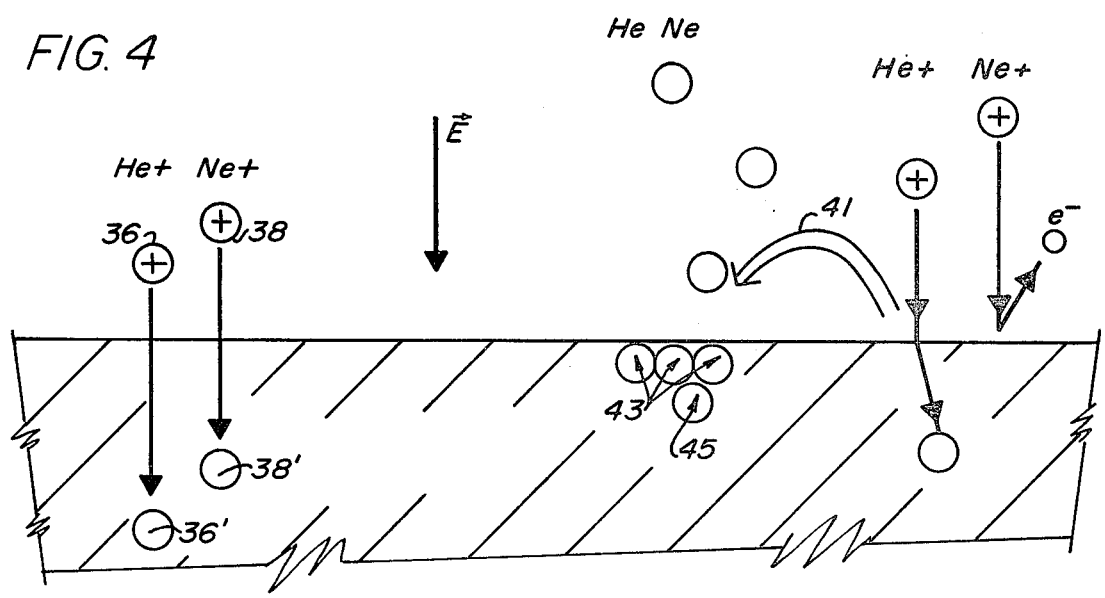
FIG. 4 is a diagrammatic view showing, on an atomic level, the action of ionized atoms on the cold cathode.

FIG. 4 is a diagrammatic illustration of the way in which ionized atoms are used in a cold cathode operation to bombard the cathode material to eject the electrons for the electrical operation of the cathode-anode structure.

As illustrated in FIG. 4, a gas mixture, such as a helium neon gas mixture, when subjected to an electrical field, produces a number of ionized particles, such as the positively ionized helium and neon atoms 36 and 38 indicated on the left hande side of FIG. 4. When these ionized atoms are driven against the cathode by the electric field $\vec{E}$, electrons are ejected from the cathode.

The driving of the ionized atoms against the cathode can and does also produce a couple of other effects.

First of all, some of the ionized atoms 36' and 38' are physically driven below the surface of the cathode so as to become buried in the cathode material. This entraps the atoms in the cathode in an action called "gas clean-up", and this action reduces the number of atoms of gas in the tube so as to reduce the gas pressure and the power of the laser.

As illustrated on the right hand side of FIG. 4, the driving of the ionized helium and neon atoms against the cathode also produces sputtering of the material at the surface of the cathode as indicated by the arrow 41 in FIG. 4. Some of the neutral atoms 43 which are sputtered from the surface act by collision to cause additional entrapment of gas atoms 45 when the sputtered material falls back and reattaches (as shown in FIG. 4) to the cathode, or to any other nearby surface. This sputtering action is of a diffused nature because of the mechanics of the gas involved. Atoms 45 which are entrapped by the sputtered material are also lost from the active volume of gas within the tube so as to further reduce the pressure and power of the tube.

Figure 5:
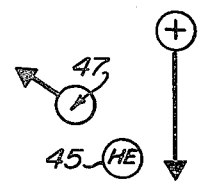
FIG. 5 is a diagrammatic view like FIG. 4 but showing how some of the ionized atoms accelerated by the electric field produce a release of previously buried gas atoms.

There is a certain amount of release of previously trapped gas atoms with continued operation in what is called a "gas release mode", and this effect is illustrated in FIG. 5. As shown in FIG. 5, as a positively charged ion strikes surface atoms 43 overlying a previously entrapped gas atom 45, a certain amount of material above the trapped atom 45 is sputtered, as indicated by reference numeral 47, and the atom 45 which had been trapped is released, as indicated by the atom 45 shown in dashed outline in FIG. 5.

If the gas clean-up and the gas release modes were balanced, there would be no net loss of gas by the sputtering action. However, in practice there has been a substantial net loss; and the amount of the loss has been a variable such as to make it difficult to accurately predict the tube life.

Figure 7:
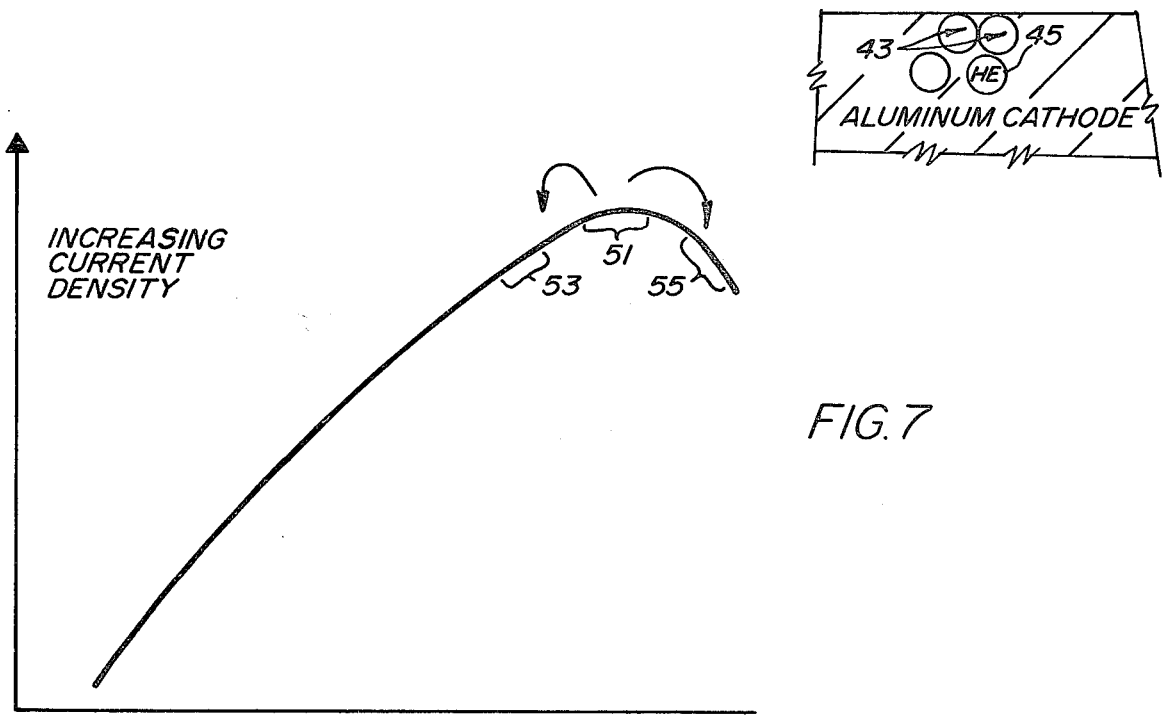
FIG. 7 is an enlarged view of the portion of the curve of FIG. 6 shown encircled by the arrows 7—7 in FIG. 6.
Figure 6:
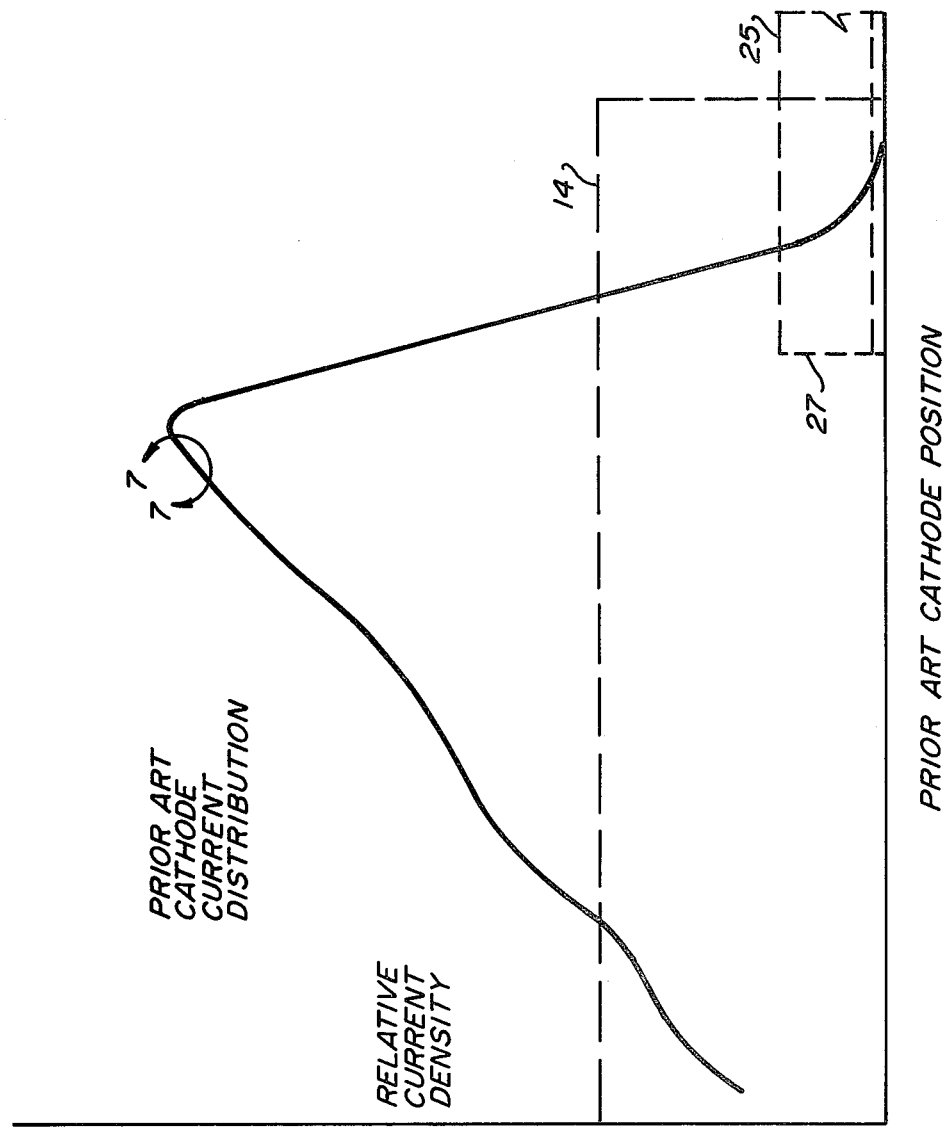
FIG. 6 is a plot of current density along the length of the type of prior art cathode shown in FIGS. 3 and 4.

FIGS. 6 and 7 illustrate why there has been a net loss with the conventional cathode construction 14 in the prior art.

FIG. 6 is a plot showing the distribution of current along the length of the conventional prior art cathode as determined by laboratory measurements. The respective locations of the conventional cathode 14 and the end 27 of the bore 25 are illustrated in FIG. 6 in vertical registry with the measurement of the current density as distributed along the length of the cathode 14. As can be seen in FIG. 6, the maximum current distribution in the cathode 14 occurs quite close to the end 27 of the bore and falls off rapidly in both directions from that point.

FIG. 7 illustrates the boundary effect produced by a non-uniform current distribution on the cathode surface.

With reference to FIG. 7 the material is sputtered from a relatively high current area 51 and is diffused substantially equally in all directions. A portion of the diffused, sputtered material from the high current area 51 will therefore land in lower current areas such as 53 and 55 and will entrap atoms in those areas.

The materials which are sputtered from the high current area 51 and which land in the lower current areas 53 and 55 entrap gas, as described above; and more gas is entrapped in these lower current areas 53 and 55 by the materials sputtered from the high current area 51 than is subsequently released by subsequent sputtering activity in those areas 53 and 55. That is, the rate of sputtering in the high current area 51 is higher than the rate of sputtering in the lower current areas 53 and 55; so the net effect is entrapment of more atoms in those areas than release of atoms in those areas. This net loss of gas because of higher current density in the area 51 than in the areas 53 and 55 occurs along the entire curve shown in FIG. 6 as long as there is non-uniformity of current distribution.

The conventional, prior art cathode 14 therefore produced a net loss of gas atoms because of the non-uniform current distribution along the length of the cathode.

The cathode of the present invention is constructed to produce an active cathode surface configured to form a substantially reentrant cavity about the bore end so that the current density on the active surface is very uniform. The geometry and function of the cathode of the present invention eliminates or substantially minimizes the non-uniformity of current density which occured in the prior art cathodes, and the cathode of the present invention therefore provides a better balance between the trapping rate and the releasing rate.

The shape of the active surface and the location of the bore end with respect to the active surface accommodate perturbations in the electric field resulting from the necessity to provide an opening 61 in the cathode for the bore 25, and in case of the application of the present invention to the cathode for a coaxially constructed laser, an additional opening 63 for the laser beam to pass through the cathode to the reflecting mirror 21 (see FIG. 1).

In the specific application of the cathode of the present invention to a laser tube as illustrated in FIG. 2, the cathode 13 is constructed in two halves 65 and 67 which mate together at a surface 69. The end 27 of the bore 25, in the specific construction illustrated in FIG. 2 extends just part way between the inner end of the entrance opening 61 and the center of the enclosure provided by the curved inner surface 37.

The surface 37 may be formed as a substantially spherical surface for some applications. In other applications the surface 37 may be formed in the shape of some other surface of revolution or in the shape of a multifaceted flat faced cavity. The important feature is that the surface 37 is a substantially reentrant cavity which distributes the various points on the surface with respect to the end 27 so as to provide a substantially uniform distribution of current density over the surface 37. As noted above, the electrical activity and field resulting from the openings required to access the interior of the cathode with the components of the operating structure affect the distribution of the current density, and the positioning of the end 27 of the bore and the exact shape of the surface 37 are matched to the perturbations in the electric field to provide the desired uniformity.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An axially elongated, cold cathode gas laser of the kind in which ionized species are accelerated against a cathode to eject electrons from the cathode for producing a gas discharge within a gas discharge confinement tube which has an end positioned adjacent the cathode, said gas laser comprising, an axially elongated outer tube filled with a gas mixture and end mirrors associated with the outer tube for providing a resonant cavity, a single anode at one end of the tube, a single, axially compact cathode at the other end of the tube and spaced from the anode by an axial distance substantially greater than the axial length of the cathode, said cathode having a first opening for a bore tube and a second opening for enabling a laser beam to pass through the cathode to a reflecting mirror of the laser, a gas discharge confinement bore tube extending between the anode and the cathode and having one end projecting through the first opening in the cathode, electrical field means effective to drive ionized species against the cathode to eject electrons from the cathode and to produce a light emitting gas discharge within said bore tube, said cathode having active surface means constructed for balancing the trapping rate and the releasing rate of gas particles in the cathode to maintain a substantially constant gas pressure during the operating life of the gas laser, said active surface means comprising a substantially spherically shaped active surface which forms a substantially reentrant cavity about the end of the gas discharge bore tube and wherein the shape of the active surface is matched to the position of the bore tube end and to the two openings in the cathode to provide a substantially uniform distribution of current density over the active surface during the operation of the gas laser.

* * * * *